July 9, 1957 W. E. BRADLEY 2,798,900

GAIN CONTROL SYSTEM FOR COLOR TELEVISION RECEIVER

Filed July 10, 1952 3 Sheets-Sheet 1

INVENTOR.
WILLIAM E. BRADLEY
BY
Allen V. Hazeltine
ATTORNEY

INVENTOR.
WILLIAM E. BRADLEY
BY
Oscar V. Hazeltine
ATTORNEY

July 9, 1957 W. E. BRADLEY 2,798,900

GAIN CONTROL SYSTEM FOR COLOR TELEVISION RECEIVER

Filed July 10, 1952 3 Sheets-Sheet 3

INVENTOR.
WILLIAM E. BRADLEY
BY
Allen V. Hazeltine
ATTORNEY

United States Patent Office 2,798,900

Patented July 9, 1957

2,798,900

GAIN CONTROL SYSTEM FOR COLOR TELEVISION RECEIVER

William E. Bradley, New Hope, Pa., assignor to Philco Corporation, Philadelphia, Pa., a corporation of Pennsylvania Application July 10, 1952, Serial No. 298,051

10 Claims. (Cl. 178—5.4)

The present invention relates to methods of and apparatus for improving color television reception, the instant disclosure being a continuation in part of my copending application, Serial No. 208,993, filed February 2, 1951. More particularly, the invention relates to circuit arrangements for maintaining predetermined amplitude relations between color television signal components of different frequencies.

The invention is particularly applicable to so-called dot-sequential systems of color television in which there is produced a signal which is successively indicative of the red, green and blue color content of small elements of the scene which is to be televised. For this purpose, there may, for example, be provided three simultaneously scanning television cameras, each of which views the scene to be televised and each of which is equipped with a primary color filter, so that one camera produces a video output signal whose amplitude varies in accordance with the green elements of the screen, while the other two cameras produce output signals respectively indicative of the red and blue scene elements. The amplitudes of the three color output signals are then sequentially sampled, at equally time spaced intervals, producing a series of pulses occurring at the sampling instants, and of amplitudes corresponding respectively to the amplitudes of different ones of the three sampled color signals, also at the sampling instants. The rate at which each of the original color signals is sampled is very high, being equal to 3.6 megacycles in some presently contemplated embodiments. These output pulses are then applied to a filter which converts them into a sinusoidally varying 3.6 megacycle signal superimposed on a more slowly varying, or average component. It then remains to combine this color signal with the necessary blanking and synchronizing impulses to ready the signal for transmission to distant receivers. As indicated, the composite picture signal, between consecutive synchronizing pulses, will consist of a component of slowly time-varying amplitude which, incidentally, corresponds to the average brightness of the televised scene, and of a sinusoidal component varying at the rate of 3.6 megacycles per second and indicative, at cyclically recurrent instants, of the intensity of each of the three transmitted primary color components. The nominal frequency of this so-called "chromaticity" component can, of course, not vary, since it is fixed by the sampling rate at the transmitter. However, both the phase and amplitude of this component can vary—the former due to changes in the ratios of the three primary color components and the latter due to changes in the absolute intensity of one or more of these primary color components.

Thus, to obtain a complete reproduction of the color signal at the receiver, there must be transmitted not only the basic 3.6 megacycle signal but also the sidebands resulting from phase and amplitude modulation thereof. It is particularly to be noted that the amplitude of the 3.6 megacycle signal component may vary even though the average brightness component remains unchanged. This will occur, for example, when the intensity of the red elements in the televised scene increases while the intensity of the green and blue elements simultaneously decreases. Under such conditions, the red signal sample and with it the maximum amplitude of the 3.6 megacycle color signal, will be increased, while the average brightness, which is a function of all three color components, remains constant. Furthermore, changes in average brightness, if any, naturally tend to occur at a much lower rate than the 3.6 megacycle rate of color signal change, and are, in fact, deliberately limited, for example to the 0 to 2.8 megacycle band at the transmitter.

At the receiver, the amplitude of the composite television signal is again sampled in synchronism with the transmitter sampling operation, means being provided for producing cyclically recurrent light emission in the three transmitted colors, at the corresponding sampling instants, and with intensities corresponding to the amplitude of the sample. It has been found that various portions of the signal path between the cameras and the receiver do not transmit the low frequency signal components corresponding to brightness and the high frequency signal components corresponding to color intensity with the same facility. This is particularly true of the path which the signal follows through the air between radiation from the transmitter antenna and reception by the receiver antenna. It is, in fact, extremely unlikely that this aerial path will attenuate the color signal to exactly the same extent as the average brightness signal. As a result the relative amplitudes of the color and brightness components will not be the same at the receiver as at the transmitter. Consequently, sampling of the received signal will not reproduce color signals of the proper amplitude and the coloration of the received picture will not be an accurate reproduction of that of the televised scene.

This would not present a serious problem if the discrepancy between the transmission characteristics of the signal path for low and high frequency signals remained fixed, for it would then be a simple matter to preset the frequency response characteristics of the receiver to compensate therefor. Unfortunately, however, this is not the case in practice. On the contrary, this discrepancy in transmission characteristics is strongly dependent upon the condition of the medium which the signal traverses, varying with weather and air mass changes as well as when tuning from one transmitter to another. Complete compensation of such variable discrepancies can not be obtained by fixed presetting of receiver characteristics.

An analogous difficulty may be encountered when it is attempted to adjust the fine tuning control of the television receiver to its optimum setting. Here the skewed frequency characteristic of the receiver amplifiers may produce different gain variations for high and low frequency signal components, thereby making it difficult to determine when the receiver is adjusted for highest fidelity of color reproduction.

Accordingly it is an object of the invention to effect improvements in apparatus for color television reception which will insure accurate reproduction of the coloration of a televised scene.

It is another object of my invention to provide means for reducing the color distortion in color television reproduction which is due to inequalities in transmisson characterstics at different frequencies of the path followed by the television signal between the transmitter and the receiver.

It is still another object to provide means, in a color television receiver, for modifying its internal frequency response characteristic so as to compensate for frequency response changes in the path followed by the signal prior to reception.

It is a still further object of the invention to incorporate means in a color television receiver which are adapted to detect changes in the frequency response of the aerial path traversed by the received signal, these means being responsive to such changes to modify the internal frequency response of the receiver so as to maintain the combined frequency response of the aerial path and receiver constant.

Still another object of the invention is to provide means, in a color television receiver, which are adapted to render its color fidelity independent of fine tuning.

If there are transmitted, in a color television system of the kind herein contemplated, not only the aforedescribed video components representative of brightness and chromaticity intelligence, but also additional components which are not representative of varying video parameters, so that their amplitudes are not subject to change because of variations in picture intelligence, and if these additional components are instead transmitted with predetermined known relative amplitudes, then their relative amplitudes can be compared at the receiver to produce an unambiguous indication of changes to which the relative amplitudes of the different video components have been subjected during transmission, provided different ones of these additional components undergo the same relative amplitude changes in the course of transmission as do the different video components.

More particularly, the amplitudes of these additional components can then be measured at the receiver and signals can be produced which are indicative of the changes to which the video signal components have been subjected relative to each other.

These signals may then be utilized to control the gain of signal transducers differently for different ones of the video components and in such manner as to restore the original desired amplitude relationship between them.

As has been explained, the undesired changes in relative amplitudes, to which the video components are subject during transmission, are due to their location in different frequency ranges. Therefore, these undesired amplitude variations will be accurately represented by the relative amplitude variations of the aforementioned additional signal components, if the latter are also respectively located in these different frequency ranges.

Fortunately, in most color television systems of the type herein contemplated, such additional signal components exist in the normally transmitted signal and therefore need not be separately provided for my purpose. For example, there are commonly produced, in color television systems, horizontal line synchronizing pulses and color synchronizing bursts. The former are analogous to the horizontal line synchronizing pulses conventionally provided in black-and-white television systems. They recur with a frequency equal to the line scanning rate (normally 15.75 kilocycles) so that at least their fundamental component falls within the range of frequencies of the brightness component of the composite signal. In normal practice the amplitude of these synchronizing pulses is held constant at the transmitter irrespective of changes in the video components of the signal.

The color synchronizing bursts, on the other hand, are transmitted at cyclically recurrent intervals in order to provide a frequency and phase reference signal for the chromaticity representative component of the composite signal. Each such color burst may consist of an odd number of half cycles of a sinewave having the same frequency as the chromaticity component and therefore lying at the center of the range of chromaticity signal frequencies. However, the amplitude of successive color bursts is also deliberately maintained fixed at the transmitter, irrespective of variations in the amplitude of the video components.

A typical composite television signal may comprise the video signals hereinbefore described, the horizontal line synchronizing pulses, and blanking signals upon which these synchronizing pulses are pedestaled so as to insure that the scanning retrace lines will not become visible upon the receiver viewing tube screen. In accordance with present operating standards, the line synchronizing pulses occupy only the leading portion of the space atop each blanking pulse, leaving the trailing portion unoccupied. It is upon this trailing portion or "backporch" of the blanking pedestal that each color burst is superimposed at the transmitter. Since the amplitude of the horizontal line synchronizing pulses, as well as that of the color synchronizing bursts is held constant at the transmitter, their relative amplitudes will also bear a predetermined constant ratio to each other.

It will be understood that if for some reason either the horizontal line synchronizing pulses or the color synchronizing bursts are not produced at the transmitter in this desired constant amplitude relationship, then still other signal components may be found useful for producing the desired indications of relative amplitude changes due to signal transmission path characteristics. Alternatively, signals having components in the different video frequency ranges may be especially provided for this purpose at the transmitter.

Briefly summarizing, then, my invention permits the maintenance of full image reproduction fidelity at the receiver despite unequal variations in transmission characteristic of the signal path for low and high frequency signal components. This is accomplished by measuring the relative amplitudes of received signal components which are subject only to variations due to these differences in transmission characteristics and by deriving from this measurement control signals for reestablishing the transmitted amplitude relationship of those signal components which are also subject to variations representative of picture intelligence. The signal components preferably used for purposes of such relative measurement are the horizontal synchronizing pulses and the color synchronizing bursts, because their frequencies are respectively representative of the two different frequency ranges occupied by the picture intelligence representative components, while their relative amplitudes are independent of picture intelligence and therefore dependent only upon the transmission characteristics of the signal path.

The broad concept of compensating for relative signal amplitude variations in the manner hereinbefore outlined is disclosed in my aforementioned copending application No. 208,993, of which this is a continuation. The claims herein are directed to a system wherein the chrominance component is derived from the composite signal and is separately controlled.

The various features and operational characteristics of apparatus embodying my invention will be more readily understood from the subsequent detailed discussion and accompanying drawings wherein.

Figure 1:
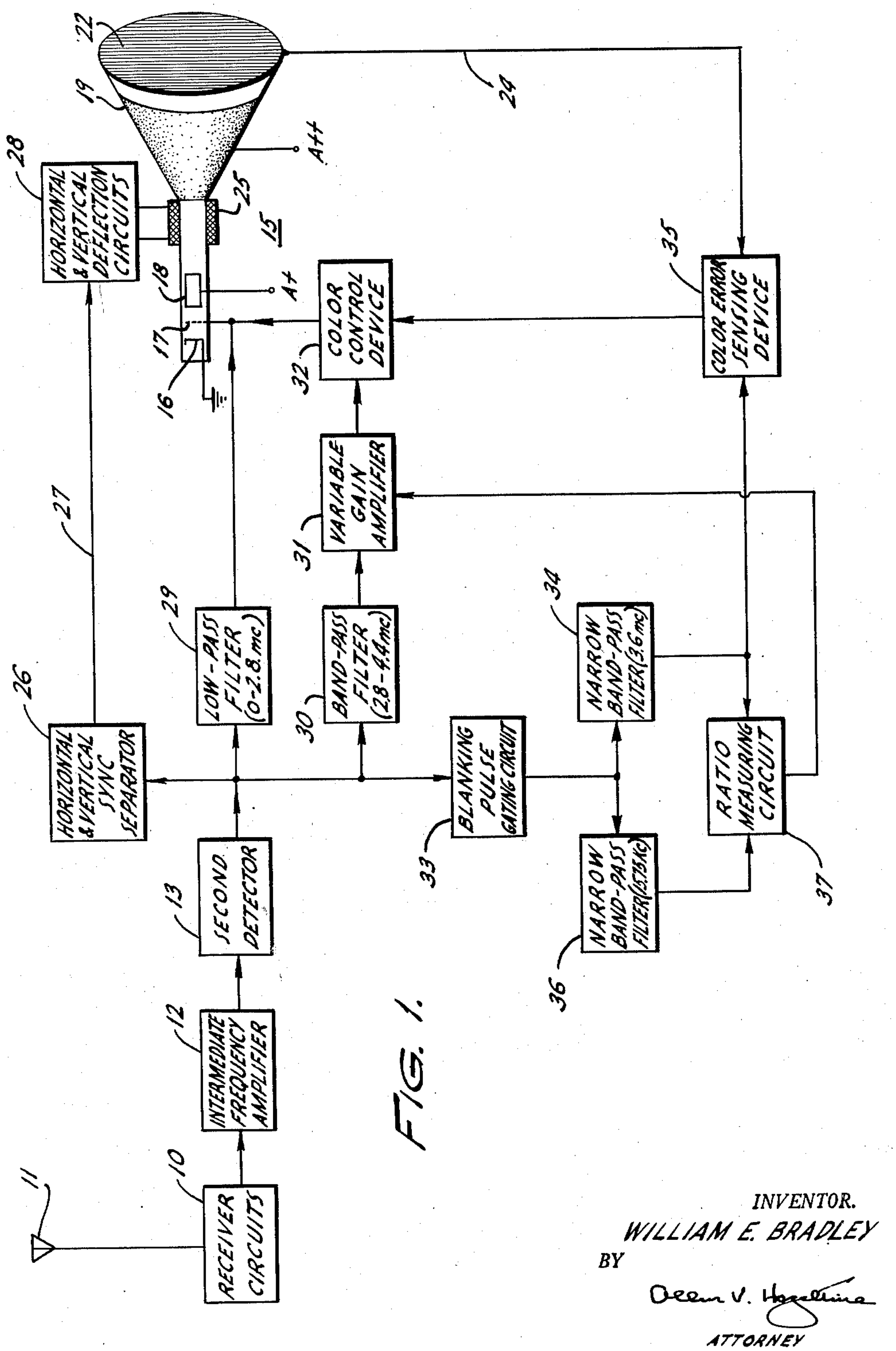
Figure 1 shows a color television receiver which incorporates one embodiment of my invention.

In the color television receiver illustrated in Figure 1 of the drawings, to which reference may now be had, the block designated 10 comprises the conventional circuits of a typical television receiver including the R.-F. tuner supplied with incoming signals from an antenna 11 and the converter. These conventional circuits 10 are followed by a conventional intermediate frequency amplifier 12 of any of the several types commonly used in present-day television receivers. The output of this intermediate frequency amplifier is supplied to a conventional second detector 13 which operates to detect the envelope of the intermediate frequency signals supplied thereto, producing a video frequency output signal which corresponds to the composite picture signal derived from the transmitter cameras, together with such blanking and synchronizing pulses as may be superimposed thereon for known purposes. Both the I.-F. amplifier 12 and the second detector 13 are conventional in television receivers, where they function in the manner hereinbefore outlined.

As has been indicated, the video signal produced by the second detector comprises components representative of the brightness of the televised scene and occupying, for example, the 0 to 2.8 megacycle frequency range. The composite video signal also comprises components representative of chromaticity intelligence respecting the same televised scene and occupying, in a typical case, the 2.8 to 4.4 megacycle frequency range. Interspersed with these brightness and chromaticity components there are the usual blanking pulses, with horizontal line synchronizing pulses and color synchronizing bursts pedestaled thereon, as well as the conventional vertical synchronizing pulses.

In accordance with conventional practice in color television receivers, the video signal is separated into its several components which are then utilized to effect the reproduction of a color picture on the screen of a color picture tube 15. As here shown, this tube may comprise a cathode 16, a beam intensity control grid 17, a first anode 18 connected to a suitable source of first anode potential A+, and a second anode 19 connected to a source of suitable second anode potential A++. The screen structure 22, which may be formed on the inner surface of the tube face, may, for example, be of the form described in the copending U. S. patent application of Carlo V. Bocciarelli, Serial No. 198,709, filed December 1, 1950, and assigned to the assignee of the present invention. It may comprise a plurality of narrow, vertically disposed phosphor strips, different ones of which are emissive of light of different primary colors, such as red, green and blue, the order of arrangement of the strips being such that the horizontally scanning cathode ray beam produces red, green and blue light successively. In addition, the screen may be provided with a plurality of beam responsive, signal generating regions disposed in a geometric configuration indicative of that of the phosphor strips and from which there may be derived, through a suitable output connection 24, indexing signals indicative of the rate of traversal of the phosphor strips by the electron beam. The cathode ray tube 15 may also be provided with conventional horizontal and vertical magnetic deflection coils 25.

In accordance with conventional practice, the horizontal and vertical synchronizing signals are separated from the composite video signal present at the output of second detector 13 by means of a conventional horizontal and vertical sync separator 26, and are supplied through a connection 27 to conventional horizontal and vertical deflection circuits 28, the outputs from which are supplied to horizontal and vertical deflection coils 25 to cause the cathode ray tube beam to scan a conventional television raster on the tube screen 22.

Further in accordance with conventional practice, the brightness and chromaticity components of the composite television signal are separated by means of conventional low-pass and bandpass filters 29 and 30 respectively, having passbands in the 0 to 2.8 megacycle and 2.8 to 4.4 megacycle ranges respectively. The chromaticity component from the output of bandpass filter 30 is supplied through a variable gain amplifier 31 to a color control device 32. The variable gain amplifier 31 forms a part of the present invention and its mode of operation and function will be discussed fully hereinafter. The color synchronizing component of the composite video signal is separated by the action of blanking pulse gating circuit 33 and narrow bandpass filter 34, whose operation will be discussed more fully hereinafter, and is supplied to a color error sensing device 35 which is also supplied with the indexing signals from cathode ray tube 15 via connection 24. Color sensing device 35, which is of conventional form, is responsive to the two signals supplied thereto to produce an output signal which is indicative of the relationship between the chromaticity component of the incoming composite video signal and the position of the electron beam of cathode ray tube 15 with respect to the different color phosphor strips of the screen 22. This output signal is supplied to a conventional color control device 32 to control the phase of the chromaticity signal which is also supplied to color control device 32 from the output of bandpass filter 30 in such manner that the resultant output signal from color control device 32 is representative of intelligence regarding a particular color just at the time when the beam of cathode ray tube 15 is impingent upon a phosphor strip emissive of light of that color. The phase-controlled output of color control device 32 is supplied, along with the brightness components of the composite video signal from the output of low-pass filter 29, to control grid 17 of cathode ray tube 15 to control the intensity of the cathode ray beam as it scans the screen 22 to produce the multi-colored image.

With the exceptions hereinbefore noted, the system thus far described is entirely conventional and is fully described in detail in the copending U. S. patent application of Robert C. Moore, Serial No. 214,995, filed March 10, 1951, and assigned to the assignee of the present invention. Since it does not form a part of the present invention, but only the environment therefor, it is deemed unnecessary to discuss the structure of its components and their interrelationships in further detail. It will be understood that the invention is not limited in its application to such a system, but is applicable to color television receivers generally.

The blanking pulse gating circuit 33 hereinbefore mentioned, and which normally forms a part of a conventional system of the sort above referred to, is operative to permit passage of signals only during the occurrence of the horizontal blanking pulses in the composite video signal. It may comprise any one of a variety of well-known gating circuits. For example, it may be a triode biased so far negative as to be non-conductive during intervals between positive blanking pulses, while being driven into conduction by the application of such pulses, as well as by the still more positive synchronizing pulses and color bursts superimposed thereon. Hence the output signal from blanking pulse gating circuit 33 will consist only of the horizontal line synchronizing pulses, which are recurrent at a 15.75 kilocycle rate in accordance with standard television practice and of the color synchronizing bursts which occur immediately after each synchronizing pulse and which have, in the present example, a frequency of 3.6 megacycles.

In accordance with the invention, this output from blanking pulse gating circuit 33 is supplied to the inputs of each of two narrow bandpass filters 34 and 36, both constructed in accordance with conventional practice so as to be respectively transmissive only of signals of approximately 3.6 megacycle frequency and 15.75 kilocycle frequency. Consequently these two filters will operate to separate the fundamental component of the horizontal synchronizing pulses from the color synchronizing bursts. As hereinbefore mentioned, the color synchronizing bursts appearing in the output of narrow bandpass filter 34 are supplied to color error sensing device 35 to perform their normal function of maintaining synchronism between the occurrence of different color information in the incoming chromaticity signal component and the scanning of the different colored light emissive phosphor strips in cathode day tube 15.

In accordance with the present invention, however, the outputs of both narrow bandpass filters 34 and 36 are additionally supplied to ratio measuring circuit 37. This ratio measuring circuit is operative to produce a signal representative of the ratio of the amplitudes of the two separate output signals from filters 34 and 36. This measuring circuit may take any one of numerous conventional forms. For example, it may be constructed in the manner illustrated in Figure 19.8, on page 673 of "Waveforms" which is vol. 19 of the Massachusetts Institute of Technology Radiation Laboratory Series, published by McGraw-Hill Book Company, Inc., New York, 1949. Other conventional circuits for producing an output signal representative of the ratio of two input signals are described and illustrated on pages 668 to 674 of the same textbook and any one of these devices is suitable for utilization as the ratio measuring circuit 37 of Figure 1. As a result of the conventional operation of this ratio measuring circuit there is then available at its output a signal proportional to the ratio of the amplitudes of the horizontal line synchronizing pulses and of the other synchronizing bursts.

As previously explained, these signals, whose amplitude ratio is measured by ratio measuring circuit 37, are maintained in a predetermined constant amplitude relationship at the transmitter. If, by some chance, these signals—namely the horizontal synchronizing pulses and the color synchronizing bursts—still have the same relative amplitudes by the time they reach the video frequency stages of the receiver, then they will always produce a signal of predetermined amplitude at the output of ratio measuring circuit 37. Variable gain amplifier 31 is preferably so adjusted that chromaticity representative signals supplied thereto from bandpass filter 30 are transferred by the amplifier without modification of their amplitude whenever a control signal of this predetermined amplitude is supplied to the amplifier from ratio measuring circuit 37. The reason for this adjustment of the amplifier is, of course, that this particular control signal from ratio measuring circuit 37 denotes the existence of the desired amplitude relationship between low and high frequency video signal components, respectively, so that no readjustment of their relative amplitudes is necessary. Because, under these conditions, the high frequency video signals derived from bandpass filter 30 are transferred by variable gain amplifier 31 without change in amplitude, and the low frequency video signals are always transmitted by low-pass filter 29 without change, they can be recombined and supplied to the control grid electrode of the cathode ray tube, subject to appropriate modification in color control device 32, with the same relative amplitudes with which they are derived from second detector 13, this being the proper amplitude relationship for faithful color reproduction. Suppose, however, that a more likely situation should prevail and that the frequency response characteristics of the path followed by the transmitted signal between the transmitter and the video frequency stages of the receiver are such that high frequency, or chromaticity representative signal components are attenuated more than low frequency, or brightness representative signal components. When this happens, the amplitude of the color synchronizing bursts will also be diminished with respect to the amplitude of the horizontal synchronizing pulses, as these two signals also lie, respectively, in these different frequency bands. This change in relative amplitudes of the color synchronizing bursts and of the horizontal synchronizing pulses will produce a change in the relative amplitudes of the output signals respectively produced by narrow bandpass filters 34 and 36. This, in turn, will produce a departure in the output signal from ratio measuring circuit 37 from the amplitude which this signal had when the burst and pulse amplitudes were in their desired relationship. This departure will occur in one sense in the case under consideration, namely whenever the amplitude of the color synchronizing bursts decreases relatively to the amplitude of the horizontal synchronizing pulses. It will occur in the opposite sense whenever the amplitude of the color synchronizing bursts increases relatively to that of the horizontal synchronizing pulses. The variable gain amplifier 31 is then so constructed as to be responsive to ratio measuring circuit output signal variations in the first aforementioned sense to enhance the amplitude of chromaticity representative signals transferred thereby, while being responsive to subtractor output signal variations in the second aforementioned sense to decrease the amplitude of the signals transferred thereby. Since the brightness representative video signal components transmitted by low-pass filter 29 undergo no amplitude changes prior to their recombination with the output signal from variable gain amplifier 31, suitable adjustment of the amplifier in response to variations in the output from ratio measuring circuit 37 enables this amplifier to compensate for changes in the relative amplitudes of low and high frequency video signal components occurring during transmission and reception of these signals.

It is to be noted that the fundamental 15.75 kilocycle component of the horizontal synchronizing pulses is not the only one which may be used to measure the amplitude of the low frequency video signal components. Instead any or all of such other frequency components of these horizontal synchronizing pulses which are located within the frequency range of the low-frequency brightness components may be used for the same purpose. In that case, the bandpass characteristic of filter 36 would, of course, have to be modified to permit the passage of such other components while still excluding components of chromaticity signal frequencies. It will be understood that, no matter which synchronizing pulse components are used, the ratios of their amplitudes must be measured before they are subjected to the action of the clipping circuits which are frequently provided in color television receivers to render their synchronization less susceptible to noise disturbance. Otherwise the amplitude of the synchronizing pulse components will no longer be representative of the true amplitude of the received brightness components. Consequently video detector 13 should include no amplitude limiting circuits, such circuits being provided, if desired, in subsequent stages of the receiver.

Note further that, while the arrangement of the elements hereinbefore described is believed to be novel and without precedent in the prior art, the individual elements are all well known and do not, therefore, require a detailed description here. For example, it is well within the ability of those skilled in the art, by application of conventional principles of filter construction, to provide filters having any desired frequency transmissive characteristic. Therefore it suffices to define the filters 29, 30, 34 and 36 in terms of the particular signal frequency ranges which they are adapted to transmit. Similarly, any one of a variety of variable gain amplifiers known to the art may be used for amplifier 31 of Figure 1, so that no further description thereof is believed to be required.

The receiver system hereinbefore described with reference to Figure 1 has the desirable characteristic of compensating for relative amplitude changes between low and high frequency signal components. These relative variations are the result of unequal variations in the transmission characteristics of the signal path. However, it will be apparent that there may also occur variations in the characteristics of the signal path which affect all signal components equally. For example, when the receiver is tuned from a nearby transmitter to a distant transmitter, the change in relative amplitudes will usually be accompanied by a decrease in received signal amplitude which affects all signal components equally. When this happens, the televised image is again inaccurately reproduced, even though the relative amplitudes of the signal components are maintained in their transmitted ratio by the system illustrated in Figure 1. The inaccuracies of reproduction are, to be sure, considerably less pronounced than they would be if these relative amplitudes were not maintained constant but they are nevertheless troublesome. A receiver system in accordance with my invention, in which not only unequal variations in received signal component amplitudes but also equal variations, are compensated, is illustrated in Figure 2 of the drawings to which more particular reference may now be had.

As has been explained, the actual embodiments of the invention are confined to a relatively small portion of the complete color television receiver. Since the ancillary portions which are necessary to constitute an operative receiver have been shown in, and described with reference to Figure 1, they have been omitted from Figure 2. Instead, only the connections of the inventive embodiment to these ancillary receiver portions have been indicated.

Figure 2:
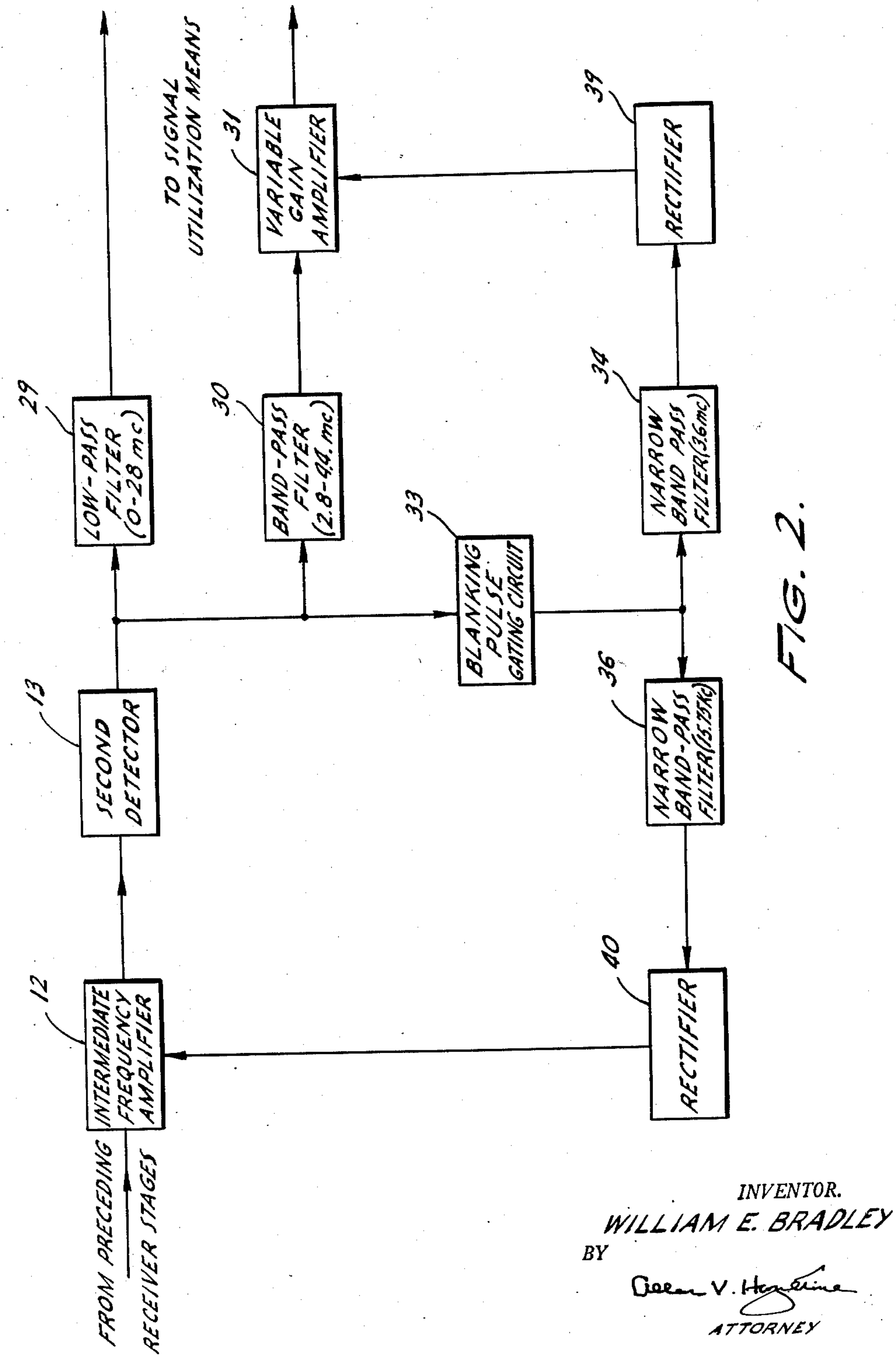
Figure 2 shows another embodiment of my invention, together with so much of the conventional apparatus shown in Figure 1 as is operationally related thereto.

Furthermore, the embodiment of Figure 2 is similar to that of Figure 1 in many important particulars, and identical components of the two embodiments have therefore been designated by identical reference numerals. Thus the embodiment of Figure 2 comprises an intermediate frequency amplifier 12 similar to the so designated intermediate frequency amplifier of Figure 1 and supplied, as was the latter, with intermediate frequency signals from preceding receiver stages. The embodiment of Figure 2 further comprises a second detector 13, a low-pass filter 29, bandpass filter 30 and variable gain amplifier 31 interconnected in the same manner as the correspondingly designated elements of Figure 1. The embodiment of Figure 2 also comprises a blanking pulse gating circuit 33 and narrow bandpass filters 34 and 36 constructed and arranged in the same manner as the correspondingly designated elements of Figure 1. Suffice it to recall, therefore, that, at the output of second detector 13, there is available a composite video signal comprising brightness and chromaticity components in different frequency bands, and blanking and synchronizing pulses interspersed therewith. The brightness and chromaticity components are separated from each other and from the remainder of the signal by low-pass filters 29 and 30 respectively as in the embodiment of Figure 1, while the horizontal line synchronizing pulses and color synchronizing bursts are separated from the remainder of the composite signal by blanking pulse gating circuit 33. In turn, these synchronizing signals are separated from each other by narrow bandpass filters 36 and 34 respectively, the fundamental component of the horizontal line synchronizing pulses being available at the output of narrow bandpass filter 36, while the color synchronizing bursts are available at the output of narrow bandpass filter 34. However, instead of being supplied to a ratio measuring circuit 37, as in the case of Figure 1, the outputs from these narrow bandpass filters 34 and 36 are, in the embodiment of Figure 2, supplied to rectifiers 39 and 40 respectively. The output from rectifier 39 is then supplied to variable gain amplifier 31, while the output from rectifier 40 is supplied to intermediate frequency amplifier 12.

When applied to rectifier 40, the output of narrow bandpass filter 36, which consists exclusively of a signal of 15.75 kilocycle frequency and has an amplitude proportional to the amplitude of the synchronizing pulses, will cause the production of a unidirectional output potential from rectifier 40 whose amplitude is also proportional to the amplitude of these synchronizing pulses. The unidirectional output voltage of this rectifier is utilized in the manner of a conventional automatic gain control potential, being applied to various portions of the intermediate frequency amplifier 12 in a manner well known to the art to provide control of the gain of this amplifier in such a manner as to maintain the amplitude of the horizontal synchronizing pulses constant. Ordinarily the conventional intermediate frequency amplifier 12 is not frequency selective as between low frequency and high frequency signal components. Therefore such control of the gain of the amplifier by a control signal proportional to the amplitude of the horizontal synchronizing pulses, as developed by rectifier 40, will modify both its low frequency response and its high frequency response, so that signals of the high color signal frequency will be enhanced and diminished in accordance with the requirements of the low frequency components, whose amplitude fluctuations are alone measured by rectifier 40. If the color television receiver is operating properly, variations in the amplitudes of any or all of the signal components in the intermediate frequency amplifier, whose low frequency output amplitude is measured by rectifier 40, are, of necessity, due to changes in the signal path external to the receiver. If these changes affect the transmission of high and low frequency signal components equally, then control of the over-all gain of intermediate frequency amplifier 12 in accordance with is low frequency signal output component, as provided by rectifier 40, will be sufficient to maintain constant not only the relative amplitudes of the synchronizing components, but also their absolute amplitudes. Similarly, the amplitudes of the picture representative signal components will be maintained at constant absolute and relative values, subject only to desired amplitude variations due to picture information. It will be recalled that this is required for faithful color reproduction. If this be the case, then the amplitude of the 3.6 megacycle color synchronizing burst, whose amplitude is independent of picture content and therefore dependent only upon the transmission characteristics of the signal path, will also remain constant, and so will the unidirectional output potential of rectifier 39 which measures the amplitude of these color bursts.

Since, as has been pointed out, the relation between the amplitudes of each color synchronizing burst and horizontal synchronizing pulse is fixed at the transmitter, it is possible to adjust the variable gain amplifier 31 so that the aforesaid constant unidirectional output potential from rectifier 39 will produce an amplifier gain just sufficient to maintain the proper amplitude relation between the high frequency components which appear at its output and the low frequency components which appear at the output of filter 29. Again, as in the case of the embodiment of Figure 1, the effect of variations in the signal path external to the receiver upon low and high frequency signal components may unequal. Then, even though rectifier 40 is operative to vary the gain of intermediate frequency amplifier 12 so as to maintain its low frequency output constant, the high frequency output of this I.-F. amplifier will, nevertheless, vary. Consequently, the amplitude of the 3.6 megacycle color synchronizing bursts will also vary, both at the output of intermediate frequency amplifier 12 and at the output of narrow bandpass filter 34. This will, in turn, produce variations in the output of rectifier 39 to which only the color synchronizing burst is applied. Thus, the amplitude of the output potential from rectifier 39 is essentially representative of the amplitude ratio of the received synchronizing signal components, just as was the amplitude of the output signal from ratio measuring circuit 37 of Figure 1. This output potential, which is supplied to variable gain amplifier 31 in a manner analogous to that in which the output potential of rectifier 40 is supplied to intermediate frequency amplifier 12, is then used to modify the gain of the amplifier 31 in direct proportion to variations in the unidirectional output potential of rectifier 39 but in opposite phase. That is, if the amplitude of the 3.6 megacycle color synchronizing burst decreases, the unidirectional output potential of rectifier 39 also decreases, the variable gain amplifier being arranged to be responsive to such decrease to increase its gain proportionally. An increase in the amplitude of the rectified output potential of rectifier 39, on the other hand, produces a corresponding decrease in the gain of amplifier 31. Variable gain amplifier 31 is then adjusted in such a manner that variations in the unidirectional control potential applied thereto from rectifier 39 will change its gain enough to compensate for signal changes indicated by control potential changes. Since bandpass filter 30 permits only high frequency signal components to traverse variable gain amplifier 31, only their amplitude will be affected by variations in its gain, thus altering the relative amplitudes of the high and low signal components as received and compensating for unequal variations of the two due to signal path characteristics.

At the outputs of filters 29 and variable gain amplifier 31 there now appear the low and high frequency components, respectively, of the composite color television signal with their relative amplitudes restored to the relation which existed between them at the transmitter and with their absolute amplitudes fixed with respect to a predetermined level independently of picture information. Thence they may be supplied to the signal ulitization means to which the corresponding elements of the system of Figure 1 are connected.

In the system of Figure 2, then, the over-all gain for both high and low frequency signal components of the intermediate frequency amplifier incorporated in my improved television receiver is controlled in response to a low frequency component of the signal whose amplitude is independent of picture information. Variations in high frequency signal component amplitude which occur independently of picture information and which are not compensated for by this process are measured by measuring the amplitude of a high frequency signal component whose amplitude is also independent of picture information, the output of the measuring device being utilized to control the amplitude of the high frequency signal components only, so as to maintain their amplitude constant.

The systems illustrated in Figures 1 and 2 have the characteristic of compensating for relative amplitude changes between high and low signal frequency components by operating on one of these components to the complete exclusion of the other. However, this necessitates complete separation of the two signal components, which can only be effected by means of the complex and expensive filters provided in these embodiments. I have found that it is possible to dispense with such complete separation of the two signal components by providing control means which operate on one component to the substantial exclusion of the other, even though both components be present at the point where control is effected. A circuit illustrating such an arrangement is shown in Figure 3, to which reference may now be had.

This circuit is similar to that of Figure 2 in many important respects and identical portions of the two figures have therefore been designated by the same reference numerals. In fact, the two circuits differ only in the precise nature of the path traversed by the composite video signal following detection. Otherwise, each circuit comprises a conventional intermediate frequency amplifier 12, a second detector 13, blanking pulse gating circuit 33, filters 34 and 36 and rectifiers 39 and 40 whose structural and operational characteristics have all been fully described in connection with Figure 2. Suffice it to recall, therefore, that rectifier 40 produces a unidirectional output potential of magnitude proportional to the amplitude of the horizontal synchronizing pulses, while rectifier 39 produces a unidirectional output potential proportional to the amplitude of the color synchronizing bursts. The former unidirectional potential is used to control the overall gain of I.-F. amplifier 12 to compensate for signal amplitude fluctuations as revealed by changes in the output of detector 19. As in the embodiment of Figure 1, a constant unidirectional potential then appears at the output of rectifier 39 as long as the high frequency response of the signal path preceding the I.-F. amplifier fluctuates equally for high and low frequency components.

When this is not the case, the output of rectifier 39 varies.

Figure 3:
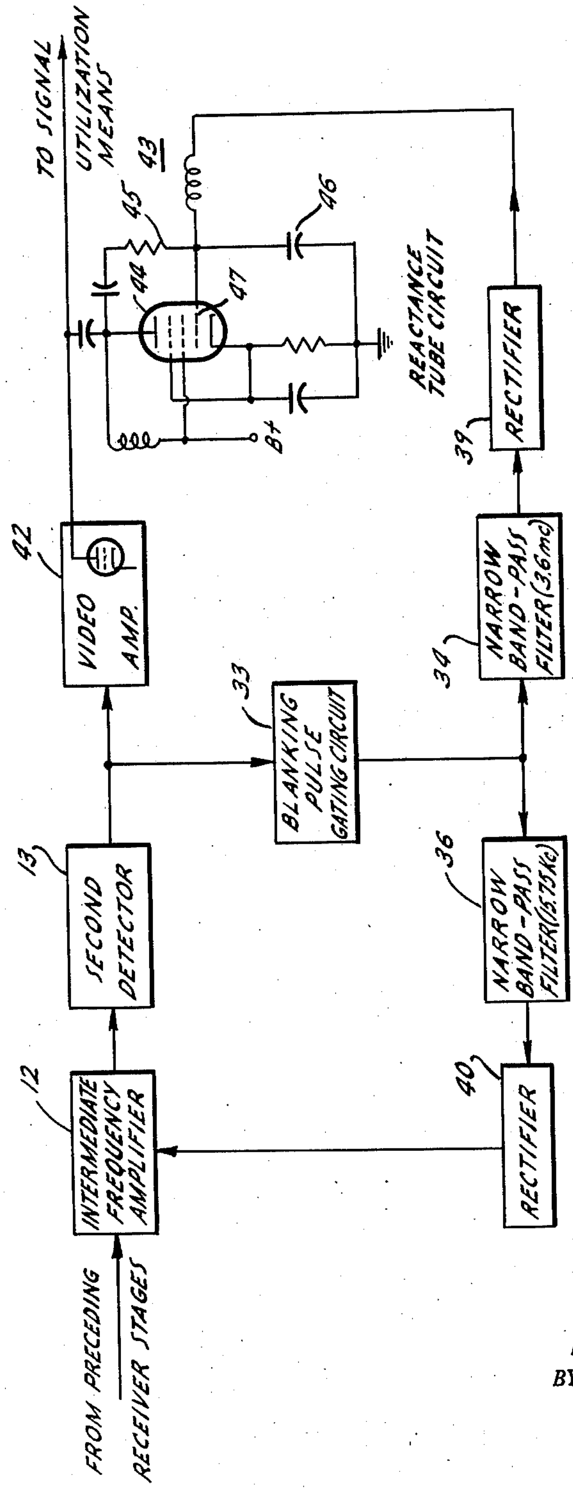
Figure 3 shows a third embodiment of my invention, together with the same conventional apparatus shown in Figure 2.

As shown in Figure 3, the output from second detector 13 is supplied, not only to gating circuit 33, but also to video amplifier 42. This video amplifier may take any conventional form provided only that it be substantially equally transmissive of both high and low frequency components of the composite video signal supplied thereto. The only additional apparatus is the reactance tube circuit 43, which is connected in shunt with the output terminal of the video amplifier 42. The reactance tube circuit is conventional in its provision of a multi-grid vacuum tube 44, conventionally connected with its anode-to-cathode circuit shunting the video amplifier output and a phase splitting network 45, 46 to whose junction the control grid electrode 47 of tube 44, as well as the output terminal of rectifier 39, are connected.

As is well known, a reactance tube circuit is characterized by the fact that its output reactance is subject to variation in response to a control potential. In the present case this reactance control potential is derived from the output of rectifier 39 and applied to grid 47 with the result that the reactance shunting the video amplifier output is directly controlled by the amplitude of the color synchronizing burst. It is then a simple matter, well within the province of those skilled in the art, to select the components of the reactance tube circuits so that increases in rectifier output potential, denoting excessive color burst amplitude, will change the reactance so as to decrease the high frequency response of video amplifier 42, while decreases in rectifier output potential, which denote insufficient color burst amplitude, are made to change the reactance so as to increase the high frequency response of this video amplifier.

As a result, changes in the high frequency response of the signal path preceding the intermediate frequency amplifier 12 which are different from corresponding changes in its low frequency response and which are, therefore, not entirely eliminated by the low frequency responsive gain control exerted by rectifier 40 on the I.-F. amplifier, will be sensed by rectifier 39, which will control the reactance of circuit 43 so as to modify the high frequency response of the video amplifier 42 to compensate for such variations.

Of course, changing of the output reactance of video amplifier 42 will have some residual effect on its low frequency response, as well, but this will be so slight compared to its effect on the high frequency response as to be negligible, under most practical conditions.

Of the several embodiments hereinbefore described in detail, those shown in Figures 2 and 3 are also shown in my aforementioned copending application No. 208,-993. The claims herein are directed to embodiments such as shown in Figures 1 and 2 wherein the chrominance component is derived from the composite signal and is separately controlled.

It will be understood that these several embodiments do not exhaust the scope of my inventive concept. On the contrary, modifications thereof will readily occur to those skilled in the art. Accordingly, I desire my invention to be limited only by the scope of the appended claims.

I claim:

1. In combination, a source of first and second intelligence signals and of third and fourth signals, the second signal occupying a certain frequency band and the first signal including frequencies outside said band, said third signal being at one of said frequencies outside said band and said fourth signal being at a frequency inside said band, said first and second signals being subject to intelligence representative variations in their relative amplitudes and also to fortuitous variations in their relative amplitudes and said third and fourth signals being subject to substantially the same fortuitous variations in their relative amplitudes as said first and second signals but substantially free from other variations in relative amplitudes; a first variable gain signal transfer device supplied with and adapted to transfer said signals; means for deriving from the output of said first variable gain signal transfer device fifth, sixth, seventh and eighth signals, respectively proportional in amplitude to said first, second, third and fourth signals in the output of said first device, said sixth signal occupying a certain frequency band and said fifth signal including frequencies outside the latter band, said seventh signal being at one of said frequencies outside the latter band and said eighth signal being at a frequency inside the latter band; means supplied with the output of said deriving means and responsive thereto to produce a signal representative solely of the amplitude of said seventh signal; means for supplying said produced signal to said first signal transfer device to control the gain of said device for signals in the frequency bands of both said first and second signals; signal-transfer means coupled to the output of said deriving means, said transfer means including separate channels for signals in the said frequency bands of said fifth and sixth signals, respectively, the channel for signals in the frequency band of said sixth signal including a second variable gain signal transfer device; means supplied with the output of said deriving means and responsive thereto to produce a signal representative solely of the amplitude of said eighth signal; and means for supplying said last-named produced signal to said second signal transfer device to control the gain of said second device.

2. A color television receiver adapted to produce a color image in response to a composite signal comprising a chrominance component occupying a certain frequency band and a luminance component including frequencies outside said band, said chrominance component being subject to undesired variations in amplitude relative to said luminance component frequencies outside said band in the course of transmission of said composite signal to said receiver, said chrominance component comprising a subcarrier whose phase and amplitude during certain intervals are representative of hue and saturation of the colors in the image, and whose amplitude during other intervals does not vary appreciably as a function of color saturation but is subject to variations in the course of transmission similar to any which occur during the first-mentioned intervals, said receiver comprising means including a variable-gain amplifier for deriving said chrominance component from said composite signal to the relative exclusion of luminance component frequencies outside said chrominance band, means for developing a control signal in accordance with the amplitude of said subcarrier during said other intervals, and means for controlling the gain of said amplifier in accordance with said control signal so as to decrease the amplifier gain in response to undesired increase of the amplitude of said subcarrier and to increase the amplifier gain in response to undesired decrease of the amplitude of said subcarrier.

3. A color television receiver adapted to produce a color image in response to a composite signal comprising a chrominance component occupying a certain frequency band and a luminance component including frequencies outside said band, said chrominance component being subject to undesired variations in amplitude relative to said luminance component frequencies outside said band in the course of transmission of said composite signal to said receiver, said chrominance component comprising a subcarrier whose phase and amplitude during certain intervals are representative of hue and saturation of the colors in the image, and whose amplitude during other intervals does not vary appreciably as a function of color saturation but is subject to variations in the course of transmission similar to any which occur during the first-mentioned intervals, said receiver comprising means including a variable-gain amplifier for deriving said chrominance component from said composite signal to the relative exclusion of luminance component frequencies outside said chrominance band, means for developing a control signal in accordance with the amplitude of said subcarrier during said other intervals, means for controlling the gain of said amplifier in accordance with said control signal so as to decrease the amplifier gain in response to undesired increase of the amplitude of said subcarrier and to increase the amplifier gain in response to undesired decrease of the amplitude of said subcarrier, color image-reproducing means, means coupling the output of said amplifier to said reproducing means, and means for supplying luminance component frequencies to said reproducing means independently of said chrominance component deriving means.

4. A color television receiver according to claim 3, wherein said last means comprises means for rejecting all frequencies within said chrominance band and supplying only the luminance component frequencies outside the chrominance band.

5. A color television receiver adapted to produce a color image in response to a composite signal comprising a chrominance component occupying a certain frequency band and a luminance component including frequencies outside said band, said chrominance component being subject to undesired variations in amplitude relative to said luminance component frequencies outside said band in the course of transmission of said composite signal to said receiver, said composite signal including line-scanning intervals and blanking intervals, said chrominance component comprising a subcarrier which is present during said line-scanning intervals and during portions of said blanking intervals, and whose phase and amplitude during said line-scanning intervals are representative of hue and saturation of the colors in the image, and whose amplitude during said blanking intervals does not vary appreciably as a function of color saturation but is subject to variations in the course of transmission similar to any which occur during the line-scanning intervals, said receiver comprising means including a variable-gain amplifier for deriving said chrominance component from said composite signal to the relative exclusion of luminance component frequencies outside said chrominance band, means for developing a control signal in accordance with the amplitude of said subcarrier during said blanking intervals, and means for controlling the gain of said amplifier in accordance with said control signal so as to decrease the amplifier gain in response to undesired increase of the amplitude of said subcarrier and to increase the amplifier gain in response to undesired decrease of the amplitude of said subcarrier.

6. A color television receiver adapted to produce a color image in response to a composite signal derived by demodulation of a transmitted modulated carrier, said composite signal comprising a luminance component and a chrominance component and occupying a predetermined band of frequencies, said chrominance component occupying a chrominance frequency band within the upper frequency portion of said predetermined band, said luminance component occupying a band of frequencies including an appreciable bandwidth below said chrominance frequency band, said chrominance component being subject to undesired variations in amplitude relative to the luminance component frequencies below said chrominance frequency band in the course of transmission of said composite signal to said receiver, said composite signal including line-scanning intervals and blanking intervals, said chrominance component comprising a subcarrier which is present during the line-scanning intervals and during portions of said blanking intervals, and whose phase and amplitude during said line-scanning intervals are representative of hue and saturation of the colors in the image, and whose amplitude during said blanking intervals does not vary appreciably as a function of color saturation but is subject to variations in the course of transmission similar to any which occur during the line-scanning intervals, said receiver comprising means for amplifying and detecting the received signal to derive said composite signal, means including a variable gain amplifier for deriving said chrominance component from said composite signal to the relative exclusion of luminance component frequencies below said chrominance frequency band, means for developing a control signal in accordance with the amplitude of said subcarrier during said blanking intervals, and means for controlling the gain of said amplifier in accordance with said control signal so as to decrease the amplifier gain in response to undesired increase of the amplitude of said subcarrier and to increase the amplifier gain in response to undesired decrease of the amplitude of said subcarrier.

7. A color television receiver according to claim 6 for reception of a composite signal which further includes horizontal synchronizing pulses occurring during said blanking intervals, said control signal-developing means comprising means for measuring the ratio of the amplitude of said subcarrier during said blanking intervals to the amplitude of said horizontal synchronizing pulses.

8. A color television receiver according to claim 6 for reception of a composite signal which further includes horizontal synchronizing pulses occurring during said blanking intervals, said receiver further comprising means for developing a control signal in accordance with the amplitude of said synchronizing pulses, and means for controlling the over-all gain of said receiver in accordance with the last-mentioned control signal prior to the detection of the received signal, so as to decrease the receiver gain as the signal amplitude increases and to increase the receiver gain as the signal amplitude decreases.

9. A color television receiver adapted to produce a color image in response to a composite signal derived by demodulation of a transmitted modulated carrier, said composite signal comprising a luminance component and a chrominance component and occupying a predetermined band of frequencies, said chrominance component occupying a chrominance frequency band within the upper frequency portion of said predetermined band, said luminance component occupying a band of frequencies including an appreciable bandwidth below said chrominance frequency band, said chrominance component being subject to undesired variations in amplitude relative to the luminance component frequencies below said chrominance frequency band in the course of transmission of said composite signal to said receiver, said composite signal including line-scanning intervals and blanking intervals, said chrominance component comprising a subcarrier which is present during the line-scanning intervals and during portions of said blanking intervals, and whose phase and amplitude during said line-scanning intervals are representative of hue and saturation of the colors in the image, and whose amplitude during said blanking intervals does not vary appreciably as a function of color saturation but is subject to variations in the course of transmission similar to any which occur during the line-scanning intervals, said receiver comprising means for amplifying and detecting the received signal to derive said composite signal, means including a variable gain amplifier for deriving said chrominance component from said composite signal to the relative exclusion of luminance component frequencies below said chrominance frequency band, means for developing a control signal in accordance with the amplitude of said subcarrier during said blanking intervals, means for controlling the gain of said amplifier in accordance with said control signal so as to decrease the amplifier gain in response to undesired increase of the amplitude of said subcarrier and to increase the amplifier gain in response to undesired decrease of the amplitude of said subcarrier, color image-reproducing means, means coupling the output of said amplifier to said reproducing means, and means for supplying luminance component frequencies to said reproducing means independently of said chrominance component deriving means.

10. In a color television receiver for receiving a television radio carrier wave modulated by a composite color television signal having a periodically recurrent line synchronizing pulse component, a color burst component comprising individual periodic bursts of a fixed signal frequency, and of a periodicity equal to that of said line synchronizing pulse component, a brightness video component, and a chrominance video component; a carrier signal demodulation circuit operatively connected in said receiver for demodulating received television radio carrier waves to deliver demodulated color television signals having the components above described; means including a variable-gain chrominance amplifier operatively coupled with the output of said demodulation circuit for deriving said chrominance video component from a demodulated signal; means for deriving said burst component from the demodulated signal; a burst rectifier circuit for rectifying the derived burst component to produce a control signal; and means for controlling the gain of said amplifier in accordance with said control signal so as to decrease the amplifier gain as the burst amplitude increases and to increase the amplifier gain as the burst amplitude decreases.

References Cited in the file of this patent

UNITED STATES PATENTS

| | | |
|---|---|---|
| 2,492,926 | Valensi | Dec. 27, 1949 |
| 2,558,489 | Kalfaian | June 26, 1951 |
| 2,566,707 | Sziklai | Sept. 4, 1951 |
| 2,606,246 | Sziklai | Aug. 5, 1952 |
| 2,635,140 | Dome | Apr. 14, 1953 |